Oct. 22, 1940.  W. C. McCOY  2,219,190
VALVE
Filed Sept. 14, 1937  2 Sheets-Sheet 1

INVENTOR
William C. McCoy
BY
Evans + McCoy
ATTORNEYS

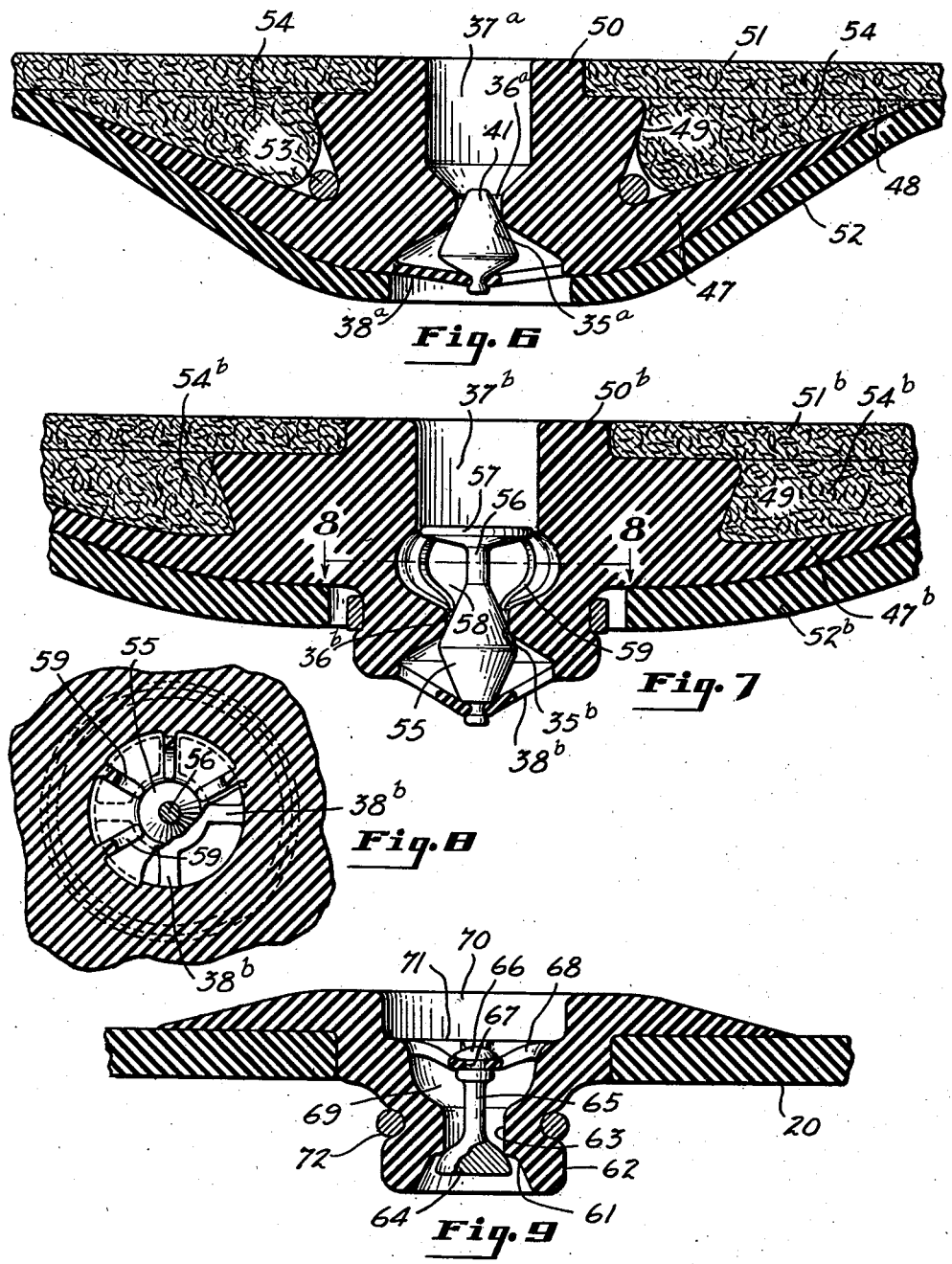

Patented Oct. 22, 1940

2,219,190

UNITED STATES PATENT OFFICE 2,219,190

VALVE

William C. McCoy, Shaker Heights, Ohio, assignor, by mesne assignments, to Jenkins Bros., Bridgeport, Conn., a corporation of New Jersey Application September 14, 1937, Serial No. 163,721

5 Claims. (Cl. 251—144)

This invention relates to valves and more particularly to inflating valves for pneumatic devices.

It is an object of the invention to provide a rubber valve, the main portion of which is normally substantially disposed within the article to be inflated and in which the valve seat is molded as a portion of the body of the valve.

Another object is to provide a concealed valve of this character in which a minimum number of parts of light-weight and inexpensive construction are employed and the rubber portion can be formed in a single molding operation.

Other objects and advantages will become apparent from the following detailed description of the invention made in connection with the accompanying drawings in which:

Figs. 6 and 7 are longitudinal sectional views illustrating modified constructions of valves embodying the invention;

Fig. 8 is a transverse sectional view, with parts removed, taken substantially on the line 8—8 of Fig. 7; and Fig. 9 is a longitudinal sectional view illustrating another modification of the present invention.

Referring to the drawings by numerals of reference, which indicate like parts throughout the several views, the invention will now be described:

Figure 1:
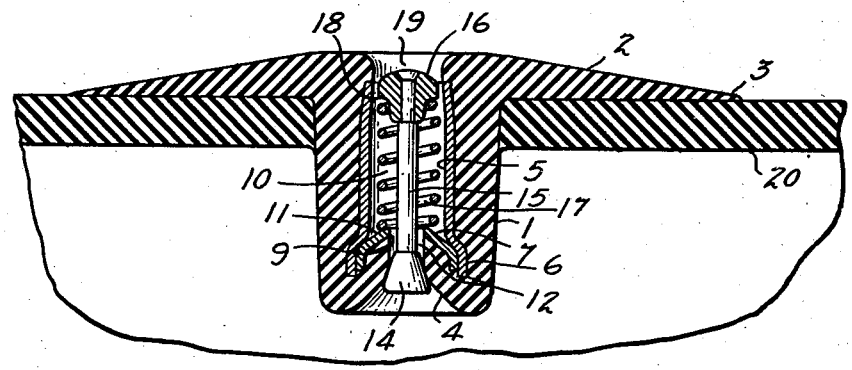
Figure 1 is a longitudinal sectional view through a valve constructed in accordance with the present invention and applied to a device to be inflated, a fragment of which is shown.

The embodiment illustrated in Fig. 1, of which the metal parts and the form of valve seat, per se, are the invention of others, comprises a substantially cylindrical body portion 1 having formed at one end a relatively thin, substantially circular or disklike attaching flap 2. This flap or holding portion preferably tapers from the relatively heavy sectioned body portion at the center thereof to a relatively thin margin 3. A bore or passage extends longitudinally through the body portion 1 and attaching flap 2. At the inner end of the body portion, opposite the attaching flap, the bore is conical in shape to provide a valve seat 4. A tubular metallic liner or insert 5 is received in the central portion of the bore and is preferably secured therein by vulcanization. The end of the insert directed toward the valve seat 4 is flared into a bell 6 which receives an annular metallic element 7 which may be retained in the end of the liner by a press fit. The rubber of the body portion extends around the end of the liner and inwardly of the bell 6 thereof so that a portion of the valve seat 4 is disposed within the bell and partially overlies the annular metal element 7 to be reinforced thereby. A central opening 9 is formed in the metal element 7 and is of substantially less diameter than passageway 10 through the insert 5, thus providing an annular spring seat 11 for a use to be later mentioned.

A substantially cylindrical passage 12, having the same diameter as the opening 9 through the element 7, is defined by the rubber disposed within the bell portion 6 of the liner and extends to the valve seat 4. Conical tapered valve body 14 is arranged to seat against the portion of the valve seat where the latter merges into the passage 12 to seal the opening through the valve. The valve body is provided with a stem 15, which may be integral if desired. This stem extends longitudinally through the bore of the valve within the liner 5 and carries a head 16 normally disposed in the opening at the end of the liner opposite the bell portion 6. Preferably the opening in which the head 16 is disposed closely surrounds the head 16 but permits a sliding fit therewith. A helical compression spring 17 is disposed in the insert 5 about the stem 15. One end of the spring bears on the previously mentioned spring seat 11 afforded by the metallic element 7 and the opposite end of the spring seats against an annular shoulder 18 formed on the under side of the head 16. The spring 17 normally urges the valve body into passage-sealing contact with the valve seat 4 and retains the head 16 in the restricted opening at the end of the insert 5. Upon depression of the head 16 the latter moves into the relatively large-diameter portion of the passageway 10 and moves the valve body 14 away from the valve seat 4 to unseal the valve and permit the flow of air.

Preferably the longitudinal passage through the valve extends outwardly beyond the restricted end of the insert 5, as indicated at 19, so that the valve head 16 is below the exposed surface of the attaching flap 2 and is thus protected against accidental displacement. In attaching the valve to an article to be inflated, such as a rubber article indicated at 20, an aperture is formed in the latter substantially corresponding in diameter to the body portion 1 of the valve and the latter is inserted therethrough after the under side of the attaching flap 2 has been coated with a suitable adhesion material such as rubber cement. The valve thus positioned is substantially flush with the surface of the article to be inflated, only the attaching flap 2 projecting above the surface of the article and the body portion and working parts of the valve being substantially concealed and disposed within the interior of the article. The danger of injury to persons using an inflated device is minimized by the present invention, which eliminates projecting metal parts. The sliding fit of the head 16 with the restricted end of the insert 5 effectively prevents dirt and other foreign material from entering the passageway through the valve, thus protecting the valve seat and valve body and maintaining a long-lasting and effective seal.

Figure 2:
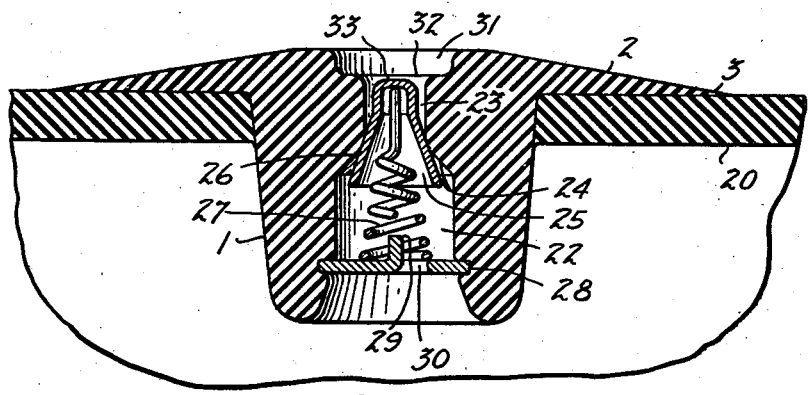
Fig. 2 is a view similar to Fig. 1 showing a modified construction.

In Fig. 2 is illustrated an improved valve in which the axial bore, extending longitudinally through the valve, comprises an inner portion 22 of relatively large diameter and an outer portion 23 of relatively small diameter. Extending between the inner and outer portions of the bore is a conical valve seat portion 24. The valve body 25 is in the form of a hollow conical cup which initially engages the annular ridge indicated at 26 where the valve seat 24 merges into the small-diameter portion 23 of the bore. The valve body 25 is light weight and normally is retained in engagement with the valve seat by a conical compression spring 27 supported in the large-diameter inner portion 22 of the bore by means of a circular holding member 28. The spring 27 applies pressure to the valve body at a point beyond the valve seat. The holding member 28 has peripheral portions seated in a groove in the side walls of the enlarged bore of the valve to retain the member in place. A tongue 29 is punched out of the holding member 28 in the direction of the valve body to center the spring 27 and provide an aperture 30 for the passage of air.

Outwardly of the small-diameter portion 23, the extreme end of the bore in the valve stem is increased in diameter, as indicated at 31, to receive an inflating device (not shown) which may abut against the shoulder 32 thus provided or have a conical tip that enters the smaller bore. Small-diameter tip end 33 of the valve body 25 is normally positioned below the level of the shoulder 32 to avoid contact with the inflating device. In this construction the entire rubber portion of the valve may be formed in a single molding operation without the incorporation of metal parts and with the valve seat and body portion integral.

Figures 3, 4:
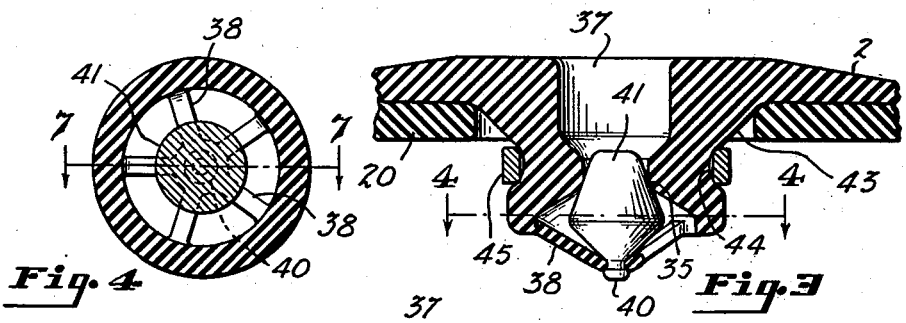
Fig. 3 is a longitudinal sectional view with parts broken away of another modified construction of valve embodying the invention.
Fig. 4 is a transverse sectional view taken substantially on the line 4—4 of Fig. 3.
Figure 5:
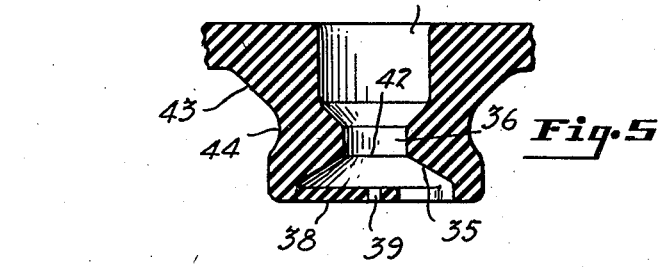
Fig. 5 is a fragmentary detail, in section, showing the body portion of the valve illustrated in Fig. 3, without the valve body.

The modification illustrated in Figs. 3, 4 and 5 has an annular conical valve seat 35 formed as a part of the body of the valve and disposed in a central portion of the longitudinally extending air passage. The relatively small-diameter portion 36 of the air passage at the end of the valve seat 35 widens out to provide an enlarged diameter substantially cylindrical passage 37 at the outer end of the bore for receiving an inflating device. A rubber spider 38 is formed integral with the body portion of the valve at the inner end of the valve seat 35. A central opening 39 in the spider receives the head 40 of a conical valve body 41 which initially has substantially a line contact with the annular ridge indicated at 42 formed by the merging of the conical valve seat 35 into the wall of the small diameter portion 36 of the valve passage.

As indicated in Fig. 5, the spider 38 is normally substantially flat in its molded position. Upon assembling the valve, the spider is stretched, as indicated in Fig. 3, so that the inherent elasticity of the rubber tends to urge the valve body 41 into passage-sealing engagement with the valve seat 35. Desirably, body portion 43 of the valve is formed with an external annular groove or depression 44 in the region of the valve seat 35 and small diameter portion 36 of the valve passage to retain an annular substantially inexpansible reinforcing element 45. Excessive distension of the valve seat by the valve body 41 is thus prevented so that the operation of the valve is improved. In this modification the valve body 41 may be constructed of hard rubber if desired. The valve is extremely resilient and withstands considerable abuse without objectionably releasing air from the device to which it is attached. The manner of attaching the valve illustrated in Figs. 2 to 5 to the device to be inflated is similar to that described in connection with Fig. 1 or, since the molded part contains no metal inserts, it may be molded as a part of the article.

In Fig. 6 is illustrated a valve construction similar to that described in connection with Figs. 3 to 5. The reference numerals previously identified have here been given the suffix "a." This embodiment, however, is particularly adaptable for use in connection with rubber bladders for footballs, basketballs and the like. A circular radially directed attaching flap 47 is integrally formed on the body portion of the valve at the inner end thereof in the region of the spider 38a. This attaching flap is of greatest thickness at the central portion thereof where it is formed into the body portion of the valve and it tapers to a thin, substantially feather edge indicated at 48. The body portion of the valve is of relatively small diameter at the base of the attaching flap 47 and increases in diameter toward the outer end of the valve, as indicated at 49.

A central upstanding annular collar 50 is formed on the outer end of the body portion of the valve and concentric with the outer enlarged diameter portion 37a of the passage. The height of the collar 50 is substantially equal to the thickness of the leather casing, indicated at 51, of the ball within which the valve is to be used. The collar may thus be received in a suitable aperture in the casing 51 to position the valve and prevent its becoming dislodged. The valve is applied to the external surface of rubber bladder 52 by a suitable adhesion agent such as rubber cement and when in use is entirely positioned within the casing 51 of the ball. An annular inextensible reinforcing member 53 is received about the small-diameter portion of the body of the valve in the region where the attaching flap 47 joins the tapered body 49. The narrow portion of the body of the valve which receives the annular ring 53 is substantially radially outward of the valve seat 35a so that the latter is reinforced against distension. Desirably, an annular socket 54 is secured to the inner surface of the leather casing 51 of the ball and concentric with respect to the opening which receives the annular collar 50. This socket is formed of a suitable shape-retaining material, such as leather or compressed cork and the like. The tapered portion of the body of the valve has a dovetail fit in the central aperture of the socket to retain the valve in alinement with the opening in the casing 51. The socket is shaped to fit between the casing and valve, thus supporting and protecting the latter during play of the ball.

Figs. 7 and 8 illustrate a modification of the embodiment shown in Fig. 6, and the reference numerals previously identified have been given the suffix "b." Valve body 55 has an outwardly directed stem portion 56 which terminates in an enlarged, disklike head 57. Between the small-diameter passage 36ᵇ and the enlarged diameter portion 37ᵇ, at the outer end of the valve bore, is a chamber 58 of relatively large diameter. The head 57 is substantially of the same diameter as the enlarged portion 37ᵇ of the valve bore, and substantially closes the latter when in normal position to close the outer opening into the chamber 58 and prevent dirt and other foreign material from interfering with the seal effected by the valve body on the valve seat 35ᵇ. During an inflating or deflating operation the head 57 moves into the chamber 58 to permit the flow of air around the marginal edges of the head and through the chamber.

If desired, a number of axial ribs 59 may be integrally formed on the walls of chamber 58 to engage and guide the head 57 when in the chamber 58. These ribs also prevent the head from circumferentially contacting the walls of the chamber and sealing the chamber when the head is fully depressed.

Referring to Figure 9, a modification is illustrated in which valve seat 61 is formed integral with cylindrical body 62 by a reduced diameter portion 63 of the axial passage through the center of the valve. The valve seat is formed adjacent the inner end of the body portion 62 and a tapered valve body 64 is arranged to engage the valve seat to seal the passage. An axially directed, upwardly extending stem 65 formed on the valve body 64 has a head 66 provided with an annular groove received in an aperture 67 of a spider 68. This spider is formed integral with the rubber of the valve and located in a portion of the axial valve passage toward the outer end thereof from the valve seat 61. During assembly the spider is deflected to substantially the position indicated in Fig. 9, so that the valve body 64 is normally urged into engagement with the valve seat 61 by the inherent elasticity of the spider. The valve bore or passage increases in diameter outwardly of the reduced diameter portion 63 as indicated at 69 to allow for deflection and movement of the spider 68. Outwardly, beyond the spider, the passage again increases in diameter, as indicated at 70, to provide a cup for receiving an inflating device. An annular shoulder 71 at the bottom of the cup 70 and surrounding the spider 68 may serve as an abutment for the inflating device (not shown), and thus protect the spider from injury as well as affording an effective seal for the air during inflation.

An annular extensible ring 72, such as a turn of heavy wire or a grommet of metal or other material, may be applied about the valve body 62 in the region of the valve seat 61 and reduced-diameter portion 63 of the valve passage to prevent distortion of the valve body and objectionable distension of the valve seat by the valve body 64.

Although several embodiments of the invention have been herein shown and described it will be understood that numerous details of the construction shown may be altered or omitted without departing from the spirit of this invention, as defined in the following claims.

What I claim is:

1. A valve comprising a relatively thin, flexible holding portion for securing the valve to an article to be inflated, a substantially cylindrical body portion integrally joined to the holding portion and having an axis substantially normal to the plane of the holding portion, an inflating aperture continuous through the holding and body portions and extending axially through the latter, a valve body supported in the aperture and arranged for axial movement therein, a valve seat integrally formed of the material of the body portion, an annular band disposed about the body portion adjacent the valve seat and formed of relatively nonyielding material to reinforce the valve seat against excessive distension, said band being of relatively short axial length with respect to said body to permit flexing of the body beyond the edges of said band and embedded in the body to retain the band in place.

2. A valve comprising a relatively thin, flexible holding portion for securing the valve to an article to be inflated, a substantially cylindrical body portion integrally joined to the holding portion and having an axis substantially normal to the plane of the holding portion, an inflating aperture continuous through the holding and body portions and extending axially through the latter, a portion of the aperture at the air inlet end thereof being of increased diameter with cylindrical wall to provide a socket for receiving an inflating device, a valve body supported in the aperture and arranged for axial movement therein, a valve seat integrally formed of the material of the body portion, means for urging the valve body into engagement with the valve seat to seal the aperture, and an annular band of substantially non-yielding material disposed about the body in the region of the valve seat, said band being of relatively short axial length with respect to said body to permit lateral flexing of the body beyond the edges of said band and being embedded in the body to retain the band in place.

3. A valve comprising a relatively thin, flexible holding portion for securing the valve to an article to be inflated, a substantially cylindrical body portion integrally joined to the holding portion and having an axis substantially normal to the plane of the holding portion, an inflating aperture continuous through the holding and body portions and extending axially through the latter, a portion of the aperture at the air inlet end thereof being of increased diameter with cylindrical wall to provide a socket for receiving an inflating device, said socket including an annular shoulder disposed circumferentially about the aperture and lying in a plane substantially normal to the axis thereof, said wall being adapted to grip the sides of the inflating device at the end thereof is seated on the shoulder, a valve body supported in the aperture and arranged for axial movement therein, a valve seat integrally formed of the material of the body portion, means for urging the valve body into engagement with the valve seat to seal the aperture, and an annular band of substantially nonyielding material disposed about the body in the region of the valve seat, said band being of relatively short axial length with respect to said body to permit lateral flexing of the body beyond the edges of said band and being embedded in the body to retain the band in place.

4. A valve comprising a relatively thin, flexible holding portion for securing the valve to an article to be inflated, a substantially cylindrical body portion integrally joined to the holding portion and having an axis substantially normal to the plane of the holding portion, an inflating aperture continuous through the holding and body portions and extending axially through the latter, a valve body supported in the aperture and arranged for axial movement therein, a valve seat integrally formed of the material of the body portion, an elastic spider positioned across the inflating aperture and arranged to carry the valve body, said valve body having interfitting engagement with the spider, and the spider normally stretched when the valve body is seated and under increased tension when the valve body is unseated.

5. A valve comprising a relatively thin, flexible holding portion for securing the valve to an article to be inflated, a substantially cylindrical body portion integrally joined to the holding portion and having an axis substantially normal to the plane of the holding portion, an inflating aperture continuous through the holding and body portions and extending axially through the latter, said aperture having an inner portion and an outer portion, the outer portion being of less diameter than the inner portion, an annular valve seat formed integrally with the body and intermediate the inner and outer portions of the inflating aperture, a valve body supported in the aperture, said valve body having a stem extending axially through the aperture toward the air inlet end thereof, an elastic spider positioned across the aperture and arranged to carry the valve body, said valve body having interfitting engagement with the spider, and the spider normally displaced axially in the aperture in the direction of flow of air therethrough in an inflating operation.

WILLIAM C. McCOY.